(12) United States Patent
Helmer et al.

(10) Patent No.: US 9,991,761 B2
(45) Date of Patent: Jun. 5, 2018

(54) ACTUATION DEVICE FOR A CLUTCH DEVICE

(71) Applicant: Schaeffler Technologies AG & Co. KG, Herzogenaurach (DE)

(72) Inventors: Daniel Helmer, Ottenhofen (DE); Marc Finkenzeller, Gengenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 179 days.

(21) Appl. No.: 14/913,844

(22) PCT Filed: Oct. 20, 2014

(86) PCT No.: PCT/DE2014/200570
§ 371 (c)(1),
(2) Date: Feb. 23, 2016

(87) PCT Pub. No.: WO2015/070854
PCT Pub. Date: May 21, 2015

(65) Prior Publication Data
US 2016/0204673 A1    Jul. 14, 2016

(30) Foreign Application Priority Data

Nov. 13, 2013 (DE) .................. 10 2013 223 044
Mar. 28, 2014 (DE) .................. 10 2014 205 851

(51) Int. Cl.
| | |
|---|---|
| *H02K 1/02* | (2006.01) |
| *H02K 7/104* | (2006.01) |
| *H02K 16/04* | (2006.01) |
| *H02K 49/00* | (2006.01) |
| *H02K 49/04* | (2006.01) |

(Continued)

(52) U.S. Cl.
CPC ............... *H02K 7/104* (2013.01); *B60L 7/28* (2013.01); *B60L 11/14* (2013.01); *B60L 15/2054* (2013.01); *H02K 1/02* (2013.01); *H02K 16/04* (2013.01); *H02K 49/00* (2013.01); *H02K 49/043* (2013.01); *H02K 49/065* (2013.01); *B60L 2220/50* (2013.01); *B60L 2240/12* (2013.01); *B60L 2240/421* (2013.01); *B60L 2240/423* (2013.01); *F16D 2023/123* (2013.01); *Y02T 10/641* (2013.01); *Y02T 10/645* (2013.01); *Y02T 10/70* (2013.01); *Y02T 10/7077* (2013.01); *Y02T 10/72* (2013.01); *Y02T 10/7275* (2013.01)

(58) Field of Classification Search
CPC .......... H02K 1/02; H02K 7/104; H02K 16/04; H02K 49/00
USPC ...................................... 310/76, 77
IPC ........................ H02K 1/02,7/104, 16/04, 49/00
See application file for complete search history.

(56) References Cited

U.S. PATENT DOCUMENTS 2,484,138 A * 10/1949 Winther ............... H02K 49/043
310/105
2,583,523 A * 1/1952 Winther ............... H02K 49/065
310/103

(Continued)

FOREIGN PATENT DOCUMENTS

| CN | 101275609 | 10/2008 |
|---|---|---|
| CN | 201133434 | 10/2008 |
| DE | 102012222110 | 6/2013 |

*Primary Examiner* — John K Kim
(74) *Attorney, Agent, or Firm* — Volpe & Koenig, P.C.

(57) ABSTRACT

An actuation device for a clutch device is provided having a magnetic field brake with a brake stator and a brake rotor. This magnetic field brake can be operated as an eddy-current brake and/or as a hysteresis brake.

8 Claims, 7 Drawing Sheets

(51) Int. Cl.
*H02K 49/06* (2006.01)
*B60L 7/28* (2006.01)
*B60L 11/14* (2006.01)
*B60L 15/20* (2006.01)
*F16D 23/12* (2006.01)

(56) References Cited

U.S. PATENT DOCUMENTS

| | | | | | |
|---|---|---|---|---|---|
| 3,624,437 | A | * | 11/1971 | Hoyler | H02K 49/043 310/53 |
| 3,624,438 | A | * | 11/1971 | Hoyler | F16D 55/00 310/53 |
| 5,238,095 | A | * | 8/1993 | Pedu | H02K 49/065 188/267 |
| 5,687,822 | A | * | 11/1997 | Arai | F16D 27/105 192/81 C |
| 6,232,686 | B1 | * | 5/2001 | Schneider | H02K 49/065 188/267 |
| 6,530,462 | B2 | * | 3/2003 | Lutz | F16D 35/024 192/58.61 |
| 8,242,652 | B2 | * | 8/2012 | Genster | H02K 49/065 310/106 |
| 8,710,779 | B2 | * | 4/2014 | Wyrembra | H02K 37/14 310/49.01 |
| 2001/0027903 | A1 | * | 10/2001 | Lutz | F16D 35/024 192/12 D |
| 2005/0040000 | A1 | | 2/2005 | Kelley, Jr. et al. | |
| 2005/0079943 | A1 | | 4/2005 | Kirkwood et al. | |
| 2005/0210490 | A1 | * | 9/2005 | Shimizu | G11B 19/2009 720/697 |
| 2008/0149451 | A1 | | 6/2008 | Pritchard et al. | |
| 2008/0236982 | A1 | | 10/2008 | Zhao | |
| 2014/0315682 | A1 | | 10/2014 | Helmer et al. | |
| 2016/0204673 | A1 | * | 7/2016 | Helmer | H02K 49/043 310/77 |

* cited by examiner

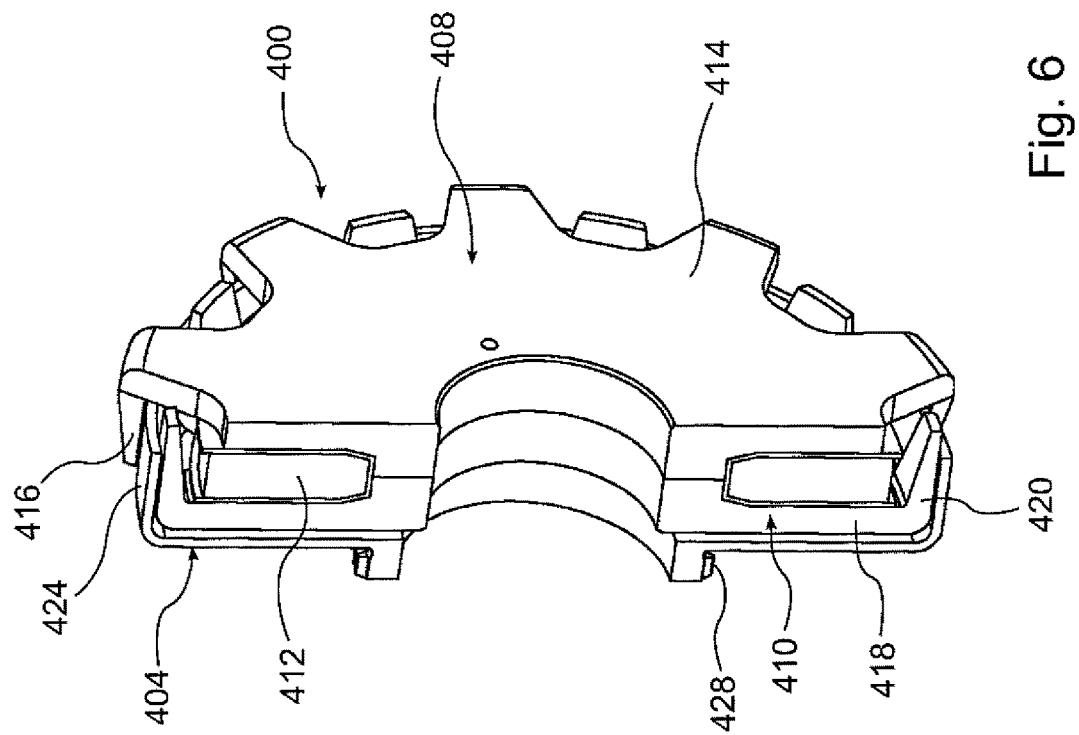
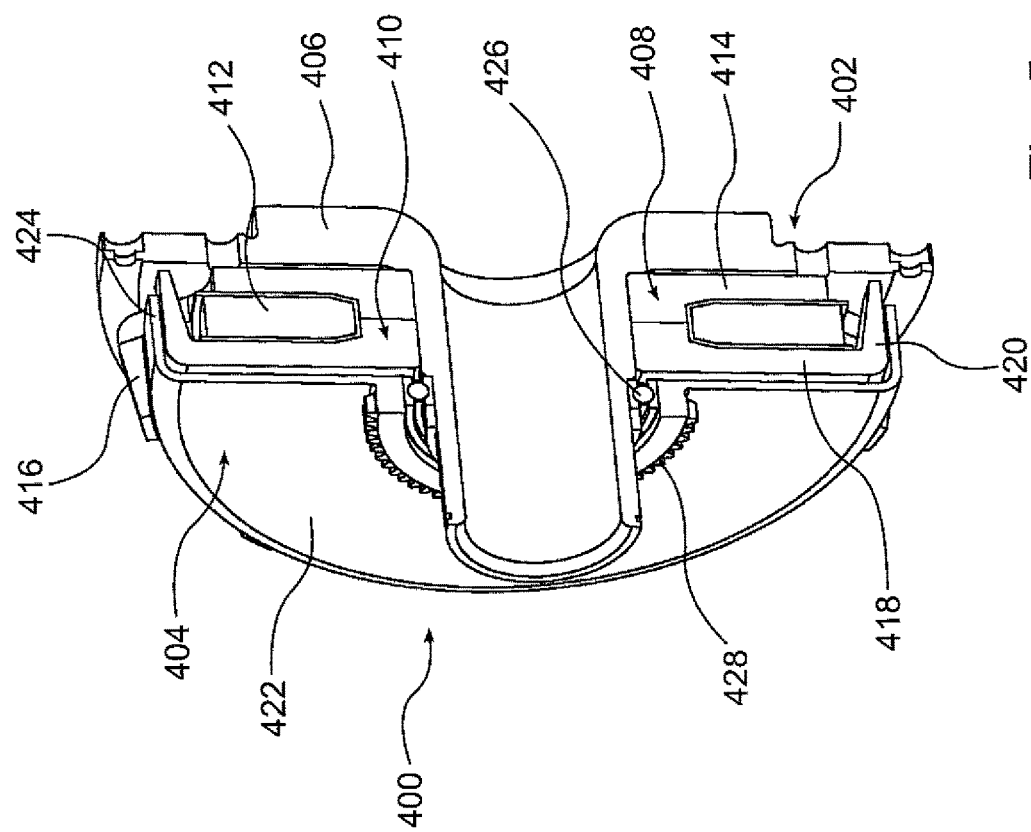

ACTUATION DEVICE FOR A CLUTCH DEVICE

BACKGROUND

The invention relates to an actuation device for a clutch device, with the actuation device comprising a magnetic field brake with a brake stator and a brake rotor.

A clutch device is known from the German patent application number 10 2013 223 004.3 filed on Nov. 13, 2013, which shows an actuating device, particularly for a drive train of a motor vehicle, with the drive train comprising an internal combustion engine, an electric machine with a stator and a rotor, and a transmission device, whereby the clutch device can be arranged in the drive train between the internal combustion engine on the one side and the electric machine and the transmission device on the other side, with the actuation device comprising an electric eddy-current brake with a brake stator and a brake rotor, and the brake stator having an internal stator with a central coil.

SUMMARY

The invention is based on the objective of improving an actuation device of the type mentioned at the outset with regards to its design and/or function. In particular, the advantages of an eddy-current brake and the advantages of a hysteresis brake can be combined. In particular, it shall also be possible to generate a brake moment without any relative rotation between the brake stator and the brake rotor. In particular, any dependency on the rotary speed shall be reduced or avoided. In particular, it shall be possible to generate a stronger brake moment, even at higher rotation differences between the brake stator and the brake rotor. In particular, a brake moment shall be generated at least approximately constant over a certain range of speeds. In particular, the ability to control a brake moment shall be improved. In particular, a brake moment shall be provided over an expanded range of rotary speeds.

The objective is attained with an actuation device for a clutch device, with the actuation device comprising a magnetic field brake with a brake stator and a brake rotor, with here it being possible to operate the magnetic field brake as an eddy-current brake and/or as a hysteresis brake.

The actuation device may have an axis of rotation. The brake rotor and the brake stator may be rotational about the axis of rotation jointly and/or in reference to each other.

The clutch device can serve for the arrangement in a drive train of a motor vehicle. The drive train may comprise an internal combustion engine, an electric machine with a stator and a rotor, a transmission device, and at least one vehicular wheel that can be driven. The clutch device may be arranged in the drive train between the internal combustion engine, on the one side, and the electric machine and the transmission device, on the other side. The clutch device may have an axis of rotation. The clutch device may have a friction clutch. The clutch device may have a multi-disk clutch. The clutch device may have at least one external disk and at least one internal disk. At least one external disk and/or at least one internal disk may have friction coatings. At least one external disk may be allocated to the rotor and/or the transmission device. At least one internal disk may be allocated to the internal combustion engine. The clutch device may have a housing. The housing may be formed with the help of the rotor. The clutch device may have a compression plate. The clutch device may have a pressure plate. The compression plate may be displaceable in an axially limited fashion in reference to the pressure plate. At least one external disk and at least one internal disk may be optionally clamped between the compression plate and the pressure plate.

The clutch device may have a clutch input part and a clutch output part. The terminology "clutch input part" and "clutch output part" are referenced to the direction of power flowing to at least one vehicle wheel that can be driven. The clutch part may have at least one internal disk. The clutch input part is connectable to the internal combustion engine in a driving fashion. The clutch output part may have at least one external disk. The clutch output part is connectable to an electric engine. The clutch output part is connectable to the rotor of the electric engine. The clutch output part is connectable to the transmission device. The clutch output part is connectable to the input shaft of the transmission device.

Starting from a completely disconnected operating position, in which essentially no power transmission at all occurs between the clutch input part and the clutch output part, to a completely engaged operating position, in which essentially a complete power transmission occurs between the clutch input part and the clutch output part, the clutch device can allow increasing power transmission depending on the actuator, with here a power transmission potentially occurring between the clutch input part and the clutch output part in a force-fitting, particularly friction-fitting fashion. Inversely, starting from a completely engaged operating position, in which essentially all power is transmitted between the clutch input part and the clutch output part, to a completely disengaged operating position, in which essentially no power is transmitted between the clutch input part and the clutch output part, depending on the actuator a reducing power transmission shall be possible. A completely engaged operating position may be a closed operating position. A completely disengaged operating position may be an open operating position. Using the operating equipment, the compression plate of the clutch device is axially displaceable. With the help of the actuation device the clutch device can be opened or closed. With the help of the actuation device the clutch device can be engaged or disengaged.

The actuation device may have a rotational ramp device with first ramps and second ramps. The actuation device may have a freewheel device that can be operated in the blocking direction or the release direction. The first ramps and the second ramps may each be arranged annularly in the circumferential direction of the clutch device. The first ramps and the second ramps may be arranged axially opposite in reference to each other. The first ramps and the second ramps may be rotational in reference to each other. Based on a motion in the circumferential direction of the clutch device, the ramp device may allow a motion in the axial direction. The ramp device may be acting in the axial direction. Roller bodies, particularly balls, may be arranged between the first ramps and the second ramps. The ramps may each form running areas for the roller bodies. The ramps may each be embodied as roller body ramps, particularly ball ramps. The ramps may be arranged distributed in the circumferential direction of the clutch device. The ramps may each be allocated slanted in reference to a plane perpendicular to the axis of rotation of the clutch device. The ramps may each be inclining and/or declining in the circumferential direction of the clutch device. The ramps may each be inclining unilaterally. The ramps may each be inclining at both sides. The first ramps and the second ramps may each be arranged complementary in reference to each other's geometry. The first ramps may correspond to the second ramps respectively such that during a motion of the first ramps and the second ramps in reference to each other in the circumferential direction of the clutch device the first ramps and the second ramps move relatively towards each other or away from each other in the direction of extension of the axis of rotation of the clutch device. The first ramps may radially support the roller bodies from the inside. The second ramps may radially support the roller bodied from the outside. The roller bodies may have such a diameter that they are held in a loss-proof manner between the first ramps and the second ramps. The roller bodies may be arranged in a roller body cage. This way, an even allocation of the roller bodies to the ramps is ensured. The second ramps may be arranged at the compression plate of the clutch device.

The freewheel device may have an internal ring and an external ring. The internal ring may be embodied as an internal star. The freewheel device may have a clamping body. The clamping body may act between the internal ring and the external ring. With the help of the freewheel device any rotation of the internal ring and the external ring is possible in reference to each other in a first direction of rotation and blocked in a second direction of rotation opposite the first direction of rotation. The first direction of rotation may represent the released direction and the second direction of rotation may represent the blocking direction. The internal combustion engine may be allocated to the internal ring. The actuation device may be allocated to the external ring. The freewheel device may have a transmission element. The transmission element may be shaped like a cup. The transmission element may be allocated at an external ring. The first ramps may be arranged at the transmission element of the freewheel device.

The clutch device may be operated by a moment generated by the internal combustion engine. The clutch device may be closed with the help of the internal combustion engine. The clutch device may be closed with the help of the moment generated by the internal combustion engine. The clutch device may be operated by controlling the speed of the internal combustion engine. The clutch device may be closed and/or opened by the speed control of the internal combustion engine.

The freewheel device may be operated in the blocked direction and the clutch device in the closed direction when the speed of a shaft allocated to the internal combustion engine is faster than the speed of the clutch output part and/or the rotor. The freewheel device may be operated in the release direction and the clutch device in the opening direction when the speed of a shaft allocated to the internal combustion engine is slower than the speed of the clutch output part and/or the rotor.

The actuation device may have a moment sensor. The moment sensor may be arranged between the internal combustion engine and the clutch device, particularly the clutch input part. The moment sensor may have a first sensor part and a second sensor part. The first sensor part and the second sensor part may be rotational in reference to each other. The first sensor part may be connected to the internal combustion engine in a torque-proof fashion. The second sensor part may be connected to the clutch device, particularly the clutch input part, in a torque-proof fashion. The moment sensor may have at least one energy storage unit. At least one storage unit may be effective between the first sensor part and the second sensor part. At least one energy storage unit may rest on the one side at the first sensor part and on the other side at the second sensor part. The moment sensor may serve to block the freewheel device only when a predetermined offset-moment has been reached, when a speed of the internal combustion engine is faster than the speed of the clutch device. The moment sensor may serve to ensure opening of the clutch device when a speed of the internal combustion engine is slower than a speed of the clutch device.

The magnetic field brake may serve to close the clutch device. An electric control device may be provided in order to control the magnetic field brake. With the help of the magnetic field brake the actuation device can be impinged such that the first ramps and the second ramps are rotated in reference to each other.

The magnetic field brake may represent an eddy-current brake. The eddy-current brake may use the eddy-current loss of the brake rotor moved in the magnetic field for braking purposes. The magnetic field brake may be a hysteresis brake. The hysteresis brake may be based on the effect of a brake stator upon the moving brake rotor. The brake stator may have an electromagnet. The electromagnet may serve to generate a magnetic field. An airgap may be formed between the brake stator and the brake rotor. The magnetic field may be controllable.

The brake rotor may inlcude a first rotor section made from a first material. The first material may have a low electric resistance. The first material may have good electric conductivity. The first rotor section may include a material, such as an aluminum alloy or a copper alloy.

The brake rotor may include a second rotor section made from a second material. The second material may represent a magnetically semi-hard material. The second material may be an alloy comprising CoFeNi, CoFrV, FeCrCo, FeCrCoMo, FeCrCoNiMo, and/or AlNiCo. The second material may be a non-magnetized permanent magnetic material with high remanence and low coercive field strength.

The brake stator may be made from several parts. The brake stator may be made from two parts. The brake stator may be made from three parts. The brake stator can be an internal stator. The internal stator may have a central coil. The internal stator may be arranged radially at the inside. The brake stator can be an external stator free from coils. The external stator may be arranged radially at the outside. The internal stator may form a first magnetic pole. The external stator may form a second magnetic pole. The brake stator may include a signal coil. The central coil may represent the only coil. The central coil may have a rotary-symmetric form. The central coil may have a coil axis. The coil axis may be coaxial in reference to the axis of rotation.

The brake rotor may have a cup-like form with a floor section and a wall section. The wall section may be arranged between the internal stator and the external stator. The brake rotor may have an eddy-current section and a hysteresis section. The eddy-current section and the hysteresis section may be arranged at the wall section. The internal stator and the external stator may limit an effective area for the eddy-current section and the hysteresis section. The first rotor section may include the eddy-current section. The second rotor section may include or form the hysteresis section. The first rotor section may form a carrier for the second rotor section. The second rotor section may have an annular form. The second rotor section may be compressed with the first rotor section.

The internal stator may have a first claw terminal with first terminal claws and a second claw terminal with second terminal claws. The central coil may be encompassed by the first claw terminal with its first terminal claws and the second claw terminal with its second terminal claws. The external stator may have a flat, annular form. The external stator may be magnetically permeable. The external stator may be embodied thinly in the radial direction. The internal stator may be arranged radially at the inside of the wall section of the brake rotor. The external stator may be arranged radially at the outside of the wall section of the brake rotor.

The first claw terminal may have a disk section. The disk section of the first claw terminal may have a radially external brim. The first terminal claws may be arranged at the radially external brim of the disk section of the first claw terminal. The first terminal claws may be at least sectionally arranged approximately at a right angle in reference to the disk section of the first claw terminal. The first terminal claws may be arranged at the disk section of the first claw terminal distributed in the circumferential direction. Gaps may form between the first terminal claws. The second terminal claw may have a disk section. The disk section of the second claw terminal may have a radially external perimeter. The second terminal claws may be arranged on the radially external perimeter of the disk section of the second claw terminal. The second terminal claws may be arranged at least sectionally at least approximately at a right angle in reference to the disk section of the second claw terminal. The second claw terminals may be arranged at the disk section of the second claw terminal distributed in the circumferential direction. Gaps may form between the second terminal claws.

The first claw terminal and the second claw terminal may be arranged parallel to each other with their disk sections and spaced apart from one another. The first terminal claws may each have a free end. The second terminal claws may each have a free end. The first claw terminal and the second claw terminal may be arranged such that the free ends of the first terminal claws and the free ends of the second terminal claws are aligned opposite each other. The first terminal claws and the second terminal claws may each alternatingly engage. The first terminal claws may engage the gaps formed between the second terminal claws. The second terminal claws may engage the gaps formed between the first terminal claws. The free ends of the first terminal claws and the free ends of the second terminal claws may each be embodied narrowly tapering.

The brake rotor may be arranged with its wall section radially at the outside of the internal stator. The brake rotor may be arranged with its wall section radially at the inside of the external stator. The brake rotor may be arranged with its wall section radially between the terminal claws of the claw terminals and the flat-annular external stator. The brake rotor may be arranged with its floor section at the disk section of the second claw terminal. The brake rotor may be arranged with its floor section parallel in reference to the disk section of the second claw terminal.

The brake stator can have a first claw terminal with first terminal claws, forming the external stator. The brake stator can have a second claw terminal with second terminal claws, forming the internal stator. The central coil may be encompassed by the second claw terminal with its second terminal claws.

The first terminal claws may be radially external terminal claws. The second terminal claws may represent radially internal terminal claws. The internal terminal claws may be arranged further towards the inside in reference to the axis of rotation than the external terminal claws. The external terminal claws may be arranged further towards the outside in reference to the axis of rotation than the internal terminal claws. An annular gap may be formed as the effective area between the external terminal claws and the internal terminal claws. The annular gap may be circular. The annular gap may have a flat-ring like form. The annular gap may be axially accessible at one side. The annular gap may be open sectionally. The annular gap may be sectionally closed with the help of the external terminal claws and the internal terminal claws. The annular gap may be limited by the external terminal claws and the internal terminal claws.

The first claw terminal can have a first disk section. The first disk section can have a radially external perimeter. The external terminal claws may be arranged at the radially external perimeter of the first disk section. The external terminal claws may at least sectionally be arranged approximately at a right angle in reference to the first disk section. The external terminal claws may be arranged at the first disk section distributed in the circumferential direction. Gaps may form between the external terminal claws.

The second claw terminal can have a second disk section. The second disk section can have a radially external perimeter. The internal terminal claws may be arranged at the radially external perimeter of the second disk section. The internal terminal claws may be arranged at least sectionally approximately at a right angle in reference to the second disk section. The internal terminal claws may be arranged at the second disk section distributed in the circumferential direction. Gaps may be formed between the internal terminal claws.

The first claw terminal and the second claw terminal may be arranged with their disk sections parallel to each other and spaced apart from each other. The external terminal claws may each have a free end. The internal terminal claws may each have a free end. The first claw terminal and the second claw terminal may be arranged such that the free ends of the external terminal claws and the free ends of the internal terminal claws are aligned opposite each other. The external terminal claws and the internal terminal claws may be arranged respectively alternating in the circumferential direction. The external terminal claws may be arranged oppositely between the gaps formed between the internal terminal claws. The internal terminal claws may be arranged oppositely between the gaps formed between the external terminal claws. The free ends of the external terminal claws and the free ends of the internal claws may each be embodied narrowly tapering.

The brake rotor may be arranged with its wall section radially at the outside of the internal stator. The brake rotor may be arranged with its wall section radially at the inside of the external stator. The brake rotor may be arranged with its wall section radially between the external terminal claws and the internal terminal claws. The brake rotor may be arranged with its floor section at a disk section of the second claw terminal. The brake rotor may be arranged with its floor section parallel in reference to the disk section of the second claw terminal.

Summarizing and in other words, therefore by the invention, among other things, a combination results of an eddy-current brake and a hysteresis brake. A structural embodiment may include an external and an internal stator. A magnetic field may be conducted in the stator, with its flux density depending on the value of an electric current in a winding, which is enclosed by the internal stator. Here, two claw terminals may form the internal stator; the magnetic field can then be closed by an external stator having an annular shape. Alternatively, a claw terminal may also form the internal stator and the second claw terminal. A rotor may be produced from two different material layers. One layer may comprise a material with low electric resistance (e.g., aluminum, copper, etc.). In this layer, the eddy-currents shall spread and ensure a higher moment for higher speeds. The second layer may comprise magnetically semi-hard material. Here, by a reversal of magnetism, beginning at a rotary speed zero, a brake moment can be generated. Aluminum may serve as the carrier material. A hysteresis material in the form of a ring may be impressed into the aluminum carrier.

With the actuation device according to the invention the advantages of an eddy-current brake and the advantages of a hysteresis brake are combined. A brake moment can here be generated even without any relative rotation between the brake stator and the brake rotor. Any function of speed is reduced or eliminated. Even at higher differential speeds between the brake stator and the brake rotor, here increased brake moments can be generated. An at least approximately constant brake moment can be generated over an expanded range of speeds. The ability to control the brake moment is improved. A brake moment is provided over an extended range of speeds.

BRIEF DESCRIPTION OF THE DRAWINGS

In the following, exemplary embodiments of the invention are described in greater detail with reference to the figures. Additional features and advantages are discernible from this description. Concrete features of these exemplary embodiments may represent general features of the invention. Features connected to other features of these exemplary embodiments may also represent individual features of the invention.

Shown schematically and as an example are:

FIG. 6 a magnetic field brake with a brake stator and a brake rotor in a perspective cross-sectional view;

DETAILED DESCRIPTION OF THE PREFERRED EMBODIMENTS

Figure 1:
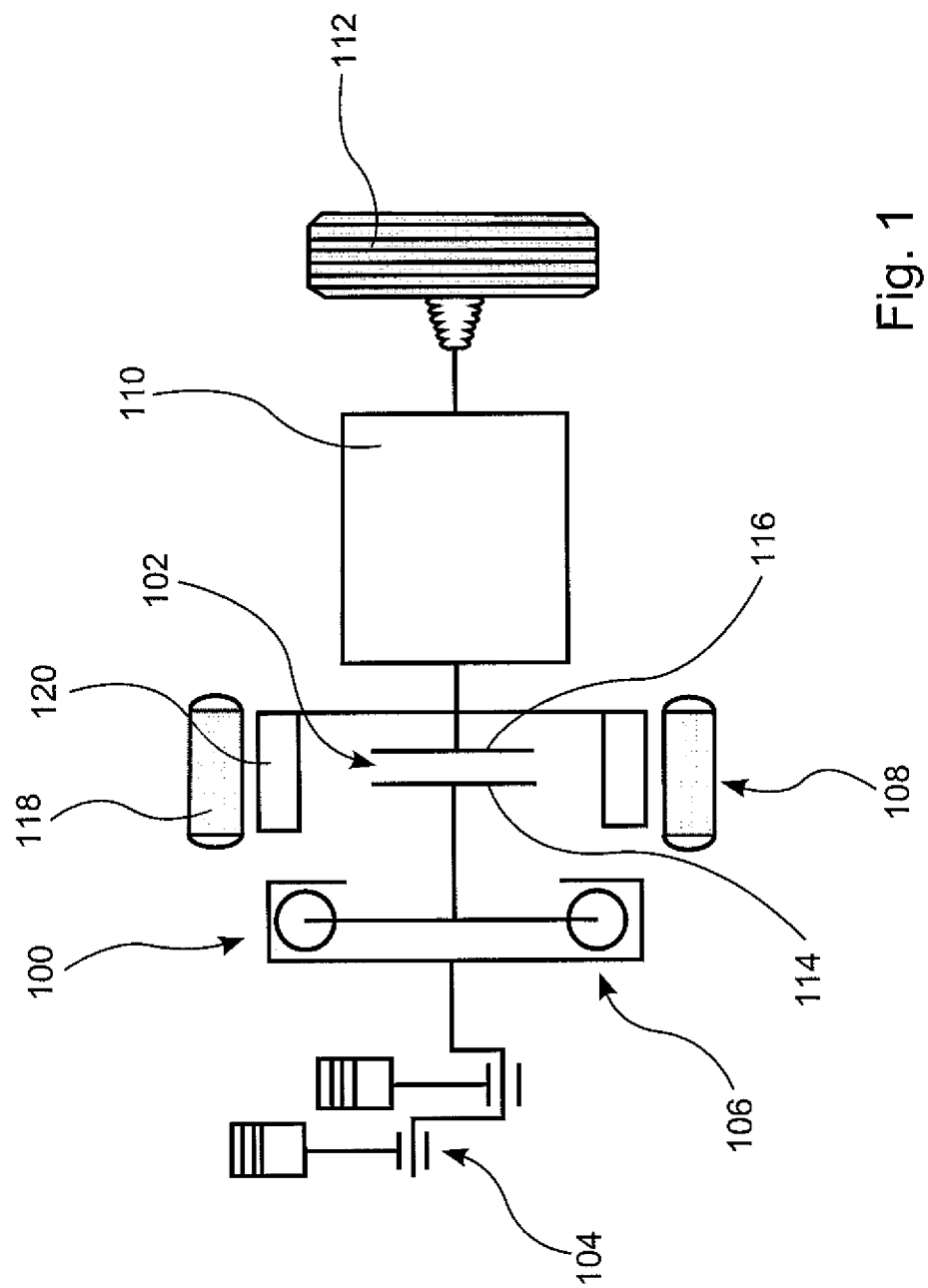
FIG. 1 a drive train of a motor vehicle with a parallel full-hybrid drive and a clutch device arranged in the drive train, FIG. 2 a rotor of an electric drive engine with an integrated clutch device and actuation device for a drive train of a motor vehicle, FIG. 3 a magnetic field brake for an actuation device of a clutch device for a drive train of a motor vehicle, FIG. 4 an internal stator of a magnetic field brake for an actuation device of a clutch device for the drive train of a motor vehicle, FIG. 5 a magnetic field brake with a brake stator and a brake rotor in a perspective cross-sectional view.

FIG. 1 shows a drive train 100 of a motor vehicle, otherwise not shown in greater detail here, with a parallel full-hybrid drive and a clutch device 102 arranged in the drive train 100. The drive train 100 includes an internal combustion engine 104, a two-weight flywheel 106, the clutch device 102, an electric drive engine 108, a transmission 110, and at least one wheel 112 that can be driven. The engine 108 can be operated as a motor. The clutch device 102 is arranged in the drive train 100 between the two weight fly-wheel 106 and the electric engine 108. The clutch device 102 is arranged in the drive train 100 between the two weight flywheel 106 and the transmission 110.

The clutch device 102 comprises a clutch input part 114 and a clutch output part 116. The clutch output part 114 is connected to the two weight flywheel 106. The clutch output part 116 is connected to the electric engine 108. The electric engine 108 comprises a stator 118 and a rotor 120. The clutch output part 116 is connected to the rotor 120 of the electric engine 108. The clutch output part 116 is connected to the transmission 110. The electric engine 108 is connected to the transmission 110. The rotor 120 of the electric engine 108 is connected to the transmission 110.

Figure 2:
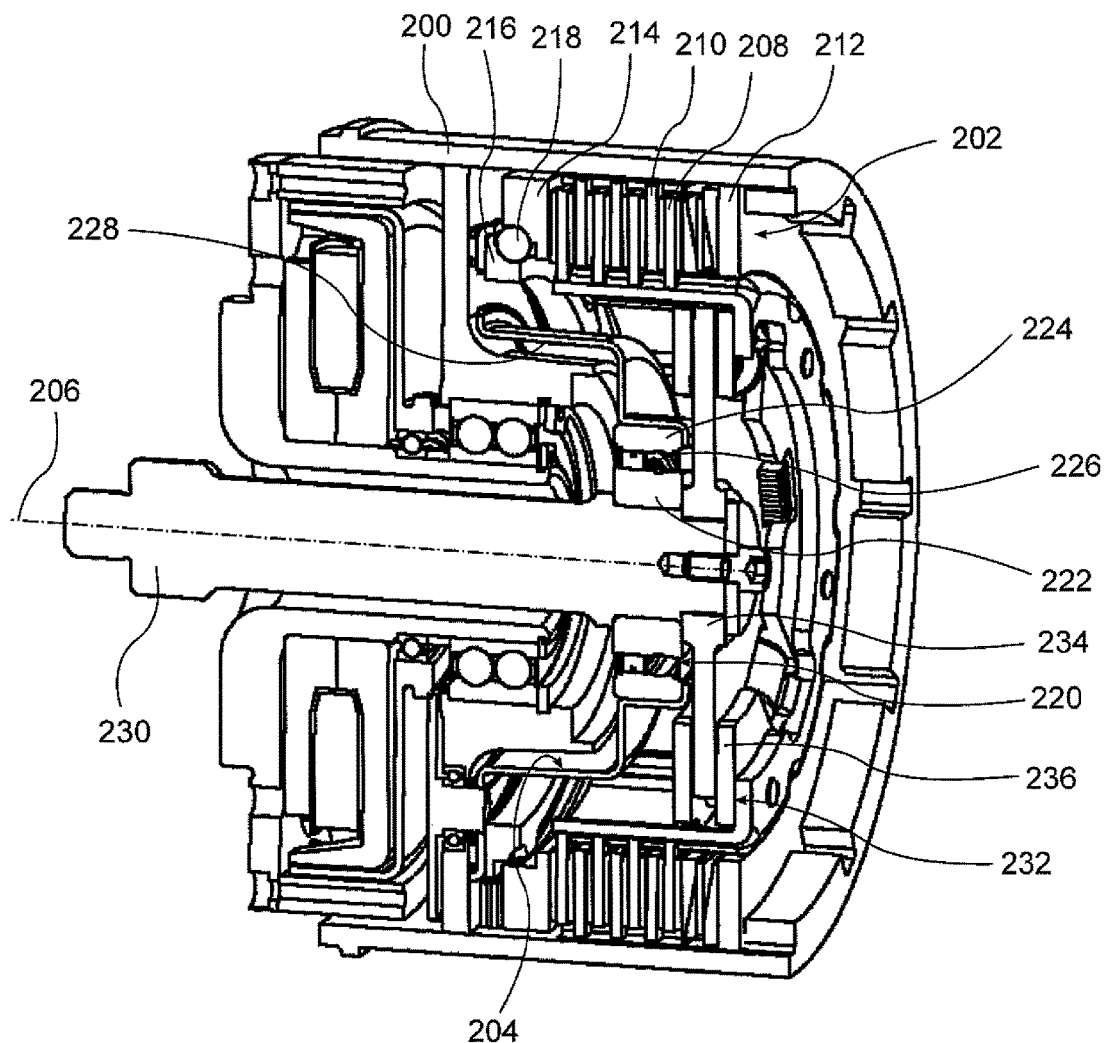

FIG. 2 shows a rotor 200 of an electric engine, otherwise not shown in greater detail, comprising an integrated disk clutch 202, as well as a clutch device 102 according to FIG. 1, with an actuation device 204 for a motor vehicle with a hybrid drive.

The rotor 200 has a rotary disk 206. The rotor 200 has a cup-like form. A cylindrical receptacle is formed in the rotor 200. The disk clutch 202 and the actuation device 204 are arranged in the receptacle. The disk clutch 202 and the actuation device 204 are arranged in the direction of extension of the axis of rotation 206 as well as in the radial direction inside the rotor 200.

The disk clutch 202 has a clutch input part and a clutch output part. The clutch input part comprises internal disks, such as 208. The internal disks 208 are allocated to the driving internal combustion engine. The clutch output part comprises external disks, such as 210. The external disks 210 are connected to the rotor 200 in a torque-proof fashion. The disk clutch 202 has a pressure plate 212 and a compression plate 214. The internal disks 208 and the external disks 210 are respectively arranged alternating between the pressure plate 212 and the compression plate 214. The pressure plate 212 is connected fixed to the rotor 200. The compression plate 214 is connected to the rotor 200 in a torque-proof fashion and can be displaced axially to a limited extend in reference to the pressure plate 212. This way, the disks 208, 210 can be clamped between the pressure plate 212 and the compression plate 214. With the help of the actuation device 204 the compression plate 214 can be impinged in the closing direction of the clutch.

The actuation device 204 comprises a ramp device. The ramp device comprises a ramp ring 216 with first ramps. The ramp device comprises second ramps. The second ramps are arranged at the compression plate 214. The ramp ring 216 with the first ramps can be rotated about the axis of rotation 206 in reference to the compression plate 214 with the second ramps. Balls, such as 218, are arranged between the first ramps and the second ramps. The actuation device 204 includes a freewheel device 220. The freewheel device 220 comprises an internal ring 222, an external ring 224, and blocking bodies, such as 226. A first direction of rotation of the freewheel device 220 is a blocking direction, a second direction of rotation opposite the first direction of rotation is a release direction. In the release direction the internal ring 222 and the external ring 224 are rotational in reference to each other. In the blocking direction, the blocking bodies 226 prevent any relative rotation between the internal ring 222 and the external ring 224, so that mechanical power can be transmitted. The freewheel device 220 comprises a freewheel cup 228. The freewheel cup 228 is connected fixed to an external ring 224 on the one side and to a ramp ring 216 of the actuation device 204 on the other side. The internal ring 222 is connected fixed to a shaft 230, which in turn is connected in a driving fashion to a driving internal combustion engine.

When a speed of the shaft 230 exceeds a speed of the clutch output part and/or the rotor 200, the freewheel device 220 is activated in the blocking direction. Then the ramp ring 216 is rotated via the internal ring 222, the blocking bodies 226, the external ring 224, and the freewheel cup 228. The rotation of the ramp ring 216 then causes via the balls 218 an axial impingement of the compression plate 214 in the closing direction of the clutch. When the speed of the shaft 230 is slower than the speed of the clutch output part and/or the rotor 200 the freewheel device 220 is activated in the release direction. Then the compression plate 214 is not impinged and the disk clutch 202 can open.

The actuation device comprises a moment sensor 232. The moment sensor 232 is arranged between the shaft 230 and the clutch input part of the disk clutch 202. The moment sensor 232 comprises a first sensor part 234 and a second sensor part 236. The first sensor part 234 and the second sensor part 236 can be rotated in reference to each other to a limited extent. The first sensor part 234 is connected to the shaft 230 in a torque-proof fashion. The second sensor part 236 is connected to the clutch input part in a torque-proof fashion. The moment sensor 236 comprises an energy storage unit, which rests on the one side on the first sensor part 234 and on the other side on the second sensor part 236. The moment sensor 232 serves to block the freewheel device 220 only as of a certain predetermined offset moment, when a speed of the shaft 230 exceeds the speed of the rotor 200. The moment sensor 232 serves to ensure the opening of the disk clutch 202, when a speed of the shaft 230 is slower than the speed of the stator 200. For the rest, additional reference is made particularly to FIG. 1 and the corresponding description.

Figure 3:
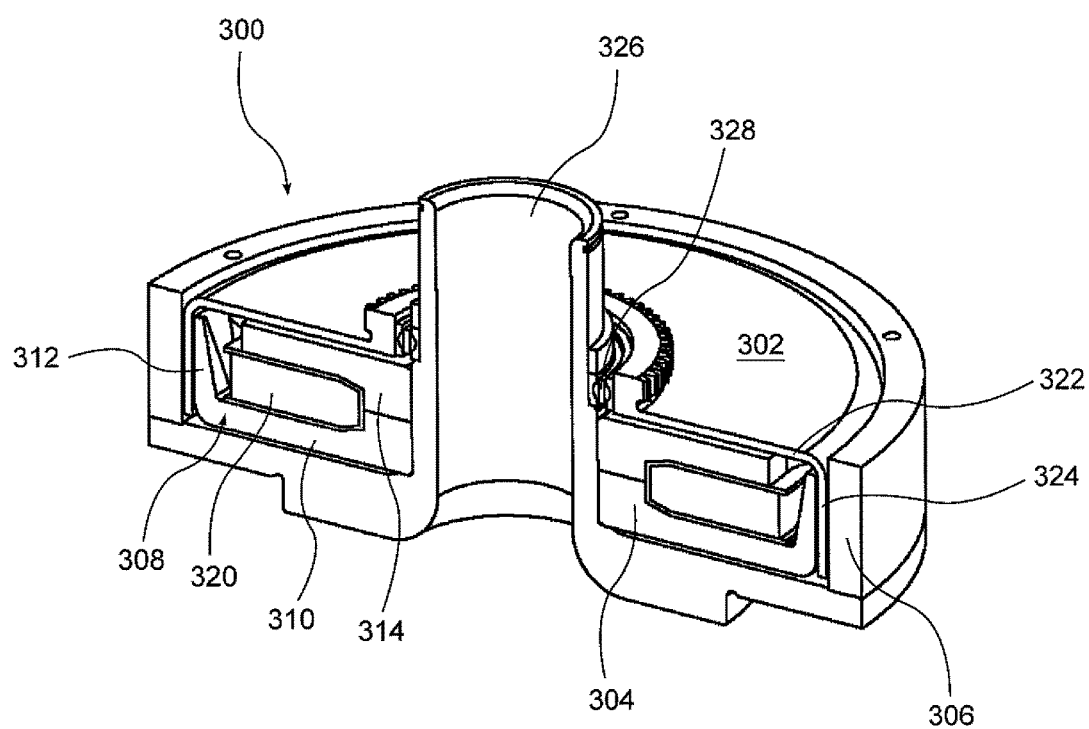
Figure 4:
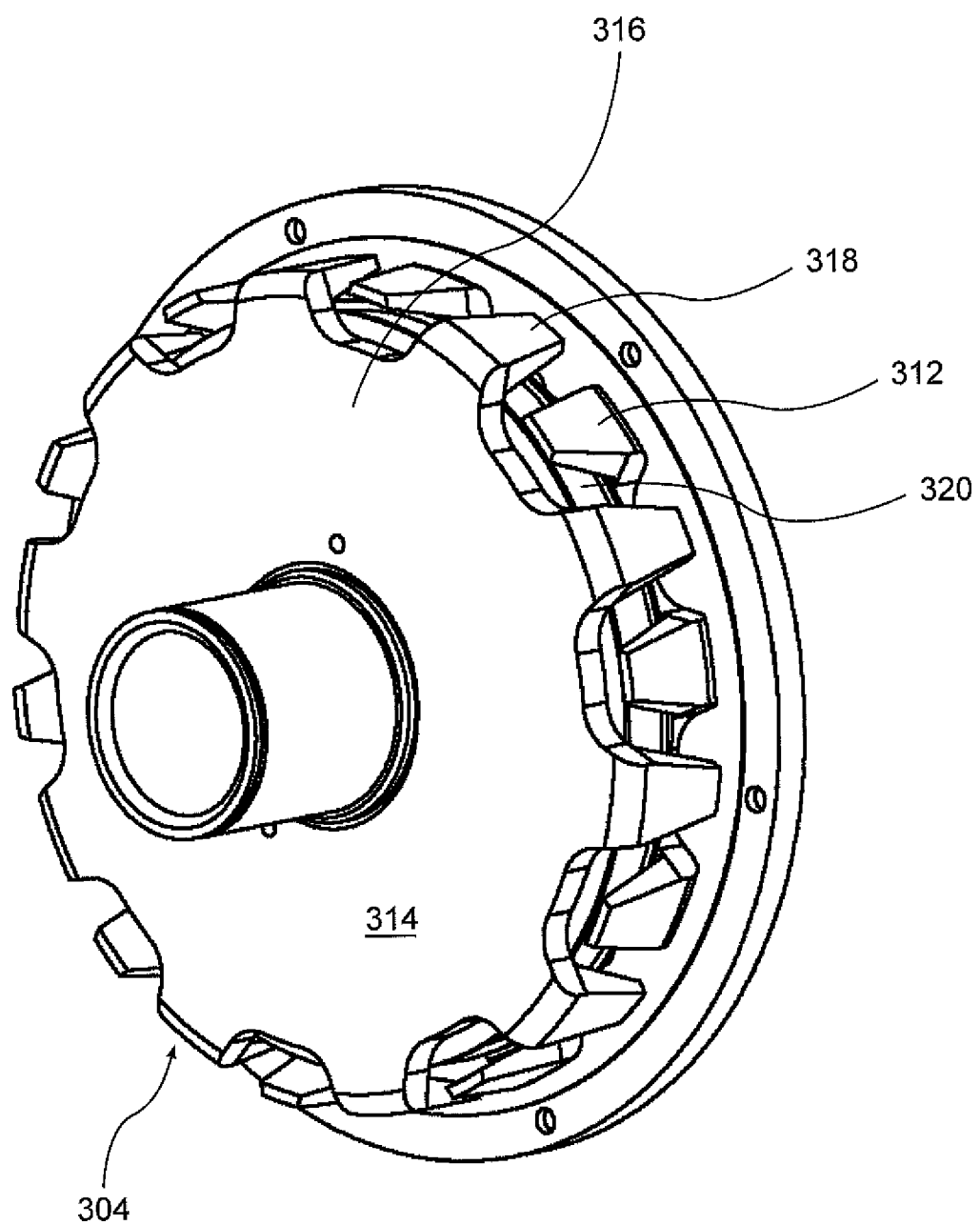

FIG. 3 shows a magnetic field brake 300 for an actuation device of a clutch device for a drive train of a motor vehicle, such as the actuation device 204 according to FIG. 2. The magnetic field brake 300 comprises a brake stator and a brake rotor 302. The brake stator comprises an internal stator 304 and an external stator 306. FIG. 4 shows the internal stator 304. The internal stator 304 comprises a first claw terminal 308 with a disk section 310 and terminal claws, such as 312. The internal stator 304 comprises a second claw terminal 314 with a disk section 316 and terminal claws, such as 318. The internal stator 304 comprises a central coil 320.

The terminal claws 312 of the first claw terminal 308 are arranged at the disk section 310 radially at the outside. The terminal claws 312 of the first claw terminal 208 are each angular in reference to the disk section 310 by approximately 90° and respectively have a free, narrowly tapering end. The terminal claws 312 of the first claw terminal 308 are arranged at the disk section 310 distributed in the circumferential direction. Gaps form between the terminal claws 312 of the first claw terminal 308.

The terminal claws 318 of the second claw terminal 314 are arranged radially at the outside of the disk section 316. The terminal claws 318 of the second claw terminal 314 are each angular in reference to the disk section 316 by approx. 90° and respectively have a free, narrowly tapering end. The terminal claws 318 of the second claw terminal 314 are arranged at the disk section 316 distributed in the circumferential direction. Gaps form between the terminal claws 318 of the second claw terminal 314.

The first claw terminal 308 with its disk section 310 and the second claw terminal 314 with its disk section 316 are arranged at both sides of the central coil 320. The terminal claws 312 of the first claw terminal 308 and the terminal claws 318 of the second claw terminal 314 encompass the central coil 320 radially at the outside. The free ends of the terminal claws 312 of the first claw terminal 308 and the free ends of the terminal claws 318 of the second claw terminal 314 are aligned opposite each other. The terminal claws 312 of the first claw terminal 308 and the terminal claws 318 of the second claw terminal 314 alternatingly engage each other. The first claw terminal 308 and the second claw terminal 314 encompass the central coil 320 radially at the inside.

The brake rotor 302 has a cup-like form with a floor section 322 and a wall section 324. The brake rotor 302 is arranged with its floor section 322 at the second claw terminal 314 and with its wall section 324 radially at the outside of the internal stator 304.

The external stator 306 is embodied without coils and has a thin, flat annular form. The external stator 306 is magnetically permeable. The external stator 306 is arranged radially at the outside of the brake rotor 302.

The internal stator 304 and the external stator 306 are connected fixed to a carrier part 326. The carrier part 326 has a flange section and a hub section. The carrier part 326 and the external stator 306 form a housing-like receptacle for the internal stator 304 and the brake rotor 302. The first claw terminal 308 is arranged at the flange section of the carrier part 326. The hub section of the carrier part 326 projects through a central recess of the internal stator 304. The brake rotor 302 is supported in a rotary fashion via a bearing 328 at the hub section of the carrier part 326. For the rest, additional reference is made particularly to FIGS. 1-2 and the corresponding description.

FIG. 5 shows a magnetic field brake 400 with a brake stator 402 and a brake rotor 404 in a perspective cross-sectional view. The brake stator 402 has a carrier part 406, a first claw terminal 408, a second claw terminal 410, and a central coil 412. FIG. 6 shows a magnetic field brake 400 in a perspective cross-sectional view without the carrier part 406.

The first claw terminal 408 comprises a first disk section 414 and external terminal claws, such as 416. The first claw terminal 408 forms an external stator. The second claw terminal 410 comprises a second disk section 418 and internal terminal claws, such as 420. The second claw terminal 410 forms an internal stator. The external terminal claws 416 are arranged radially at the outside at the first disk section 414. The external terminal claws 416 are each angular in reference to the first disk section 414 by approx. 90° and respectively have a free, narrowly tapering end. The external terminal claws 416 are arranged on the first disk section distributed in the circumferential direction. Gaps form between the external terminal claws 416.

The internal terminal claws 420 of the second claw terminal 410 are arranged radially at the outside of the second disk section 418. The internal terminal claws 420 are each angular in reference to the second disk section 418 by approx. 90° and respectively have a free, narrowly tapering end. The internal terminal claws 420 are arranged at the second disk section 418 distributed in the circumferential direction. Gaps form between the terminal claws 420.

The external terminal claws 416 are arranged in the circumferential direction opposite the gaps formed between the internal terminal claws 420. The internal terminal claws 420 are arranged in the circumferential direction opposite the gaps formed between the external terminal claws 416. The external terminal claws 416 are arranged radially further towards the outside than the internal terminal claws 420 in reference to the axis of rotation of the magnetic field brake 400 and/or the brake stator 402. The internal terminal claws 420 are arranged radially further inwardly than the external terminal claws 416 in reference to the axis of rotation. A circumferential annular gap is formed between the external terminal claws 416 and the internal terminal claws 420 as a magnetically effective area for the brake rotor 404.

The first claw terminal 408 with the first disk section 414 and the second claw terminal 410 with the second disk section 418 are arranged at both sides of the central coil 412. The external terminal claws 416 of the first claw terminal 408 and the internal terminal claws 420 of the second claw terminal 410 encompass the central coil 412 radially at the outside. The free ends of the external terminal claws 416 and the free ends of the internal terminal claws 420 are aligned opposite each other. The first claw terminal 408 and the second claw terminal 410 encompass the central coil 412 radially at the inside.

The brake rotor 404 has a cup-shaped form with a floor section 422 and a wall section. The wall section forms a wall section 424 of the brake rotor 404. The brake rotor 404 is arranged with its floor section 422 at the second claw terminal 410 and with its wall section 424 in the annular gap formed between the external terminal claws 416 and the internal terminal claws 420. The wall section 424 is arranged radially at the inside of the external terminal claws 416 and radially at the outside of the internal terminal claws 420.

The first claw terminal 408 and the second claw terminal 410 are connected fixed to the carrier part 406. The carrier part 406 has a flange section and a hub section. The carrier part 406 forms a receptacle for the first claw terminal 408, the second claw terminal 410, and the brake rotor 404. The first claw terminal 408 is arranged with its first disk section 414 at the flange section of the carrier part 406. The hub section of the carrier part 406 projects through a central recess of the first claw terminal 408 and the second claw terminal 410. The brake rotor 404 is supported with the help of a bearing 426 in a rotary fashion at the hub section of the carrier part 406. The brake rotor 404 has external gears 428. For the rest, additionally reference is made particularly to FIGS. 1-2 and the corresponding description.

Figure 7:
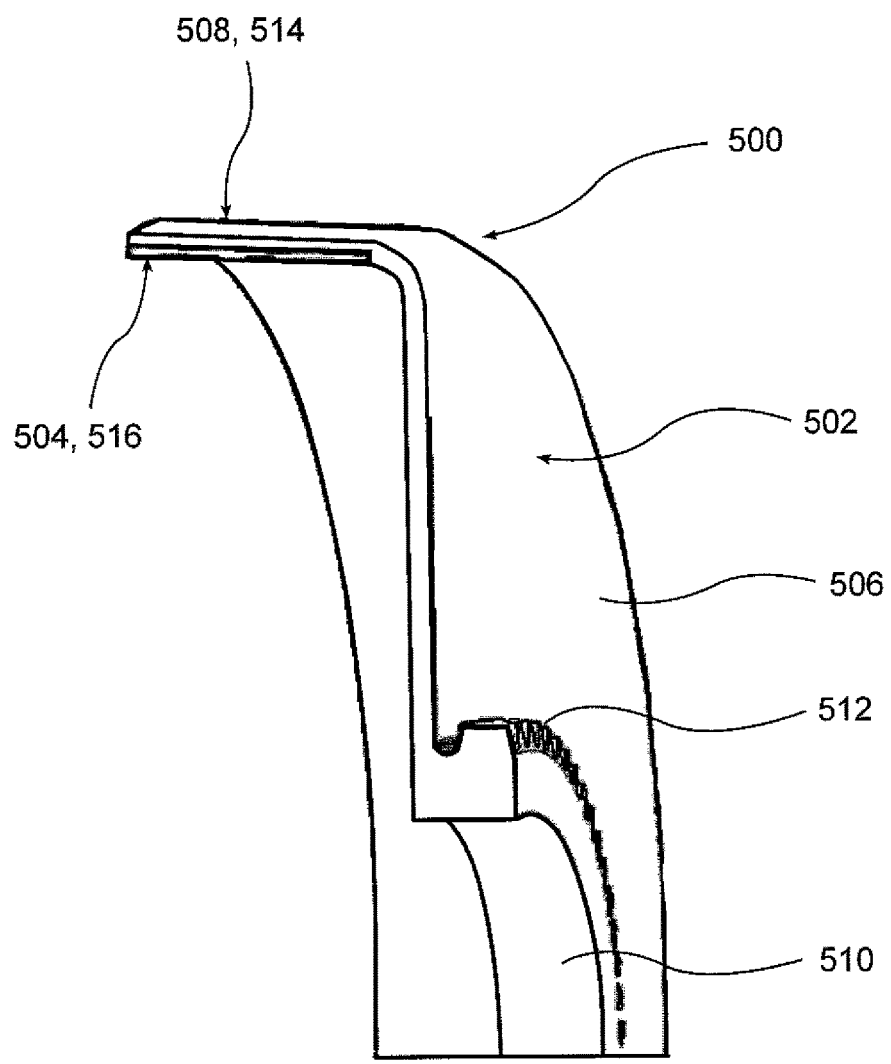
FIG. 7 a magnetic rotor with a first rotor section for operating a magnetic field brake as an eddy-current brake and a second rotor section for operating the magnetic field brake as a hysteresis brake, FIG. 8 a diagram for brake momentums of a magnetic field brake during the operation as an eddy-current brake and the operation as a hysteresis brake, and FIG. 9 a diagram for magnetically semi-hard materials.

FIG. 7 shows a brake rotor 500 with a first rotor section 502 for operating a magnetic field brake, such as a magnetic field brake 300 according to FIGS. 3-4 or a magnetic field brake 400 according to FIGS. 5-6, as an eddy-current brake and a second rotor section 504 for operating a magnetic field brake as a hysteresis brake.

The first rotor section 502 has a cup-like form with a floor section 506 and a wall section 508. The brake rotor 500 has a central opening 510. The opening 510 is arranged at the floor section 506 of the first rotor section 502. The brake rotor 500 has gears 512. The gearing 512 is arranged at the outside of the opening 510. The wall section 508 has a flat-annular shape.

The brake rotor 500 has an eddy-current section 514 and a hysteresis section 516. The wall section 508 of the first rotor section 502 forms the eddy-current section 514. The second rotor section 504 has a flat-annular form. The second rotor section 504 is arranged radially at the inside of the wall section 508 of the first rotor section 502. The second rotor section 504 is impressed into the first rotor section 502. The first rotor section 502 therefore serves as the carrier for the second rotor section 504.

The first rotor section 502 is produced from an electrically well conducting material, such as an aluminum alloy or a copper alloy. The second rotor section 504 is made from a magnetically semi-hard material, such as an alloy of CoFeNi, CoFrV, FeCrCo, FeCrCoMo, FeCrCoNiMo, and/or AlNiCo.

During the operation of the magnetic field brake as an eddy-current brake any eddy-current loss of the eddy-current section 504 moving in the magnetic field is used for the braking process. During the operation of the magnetic field brake as a hysteresis brake the effect of the magnetic field upon the moving hysteresis section 516 is utilized. For the rest, additional reference is made particularly to FIGS. 3-6 and the corresponding description.

Figure 8:
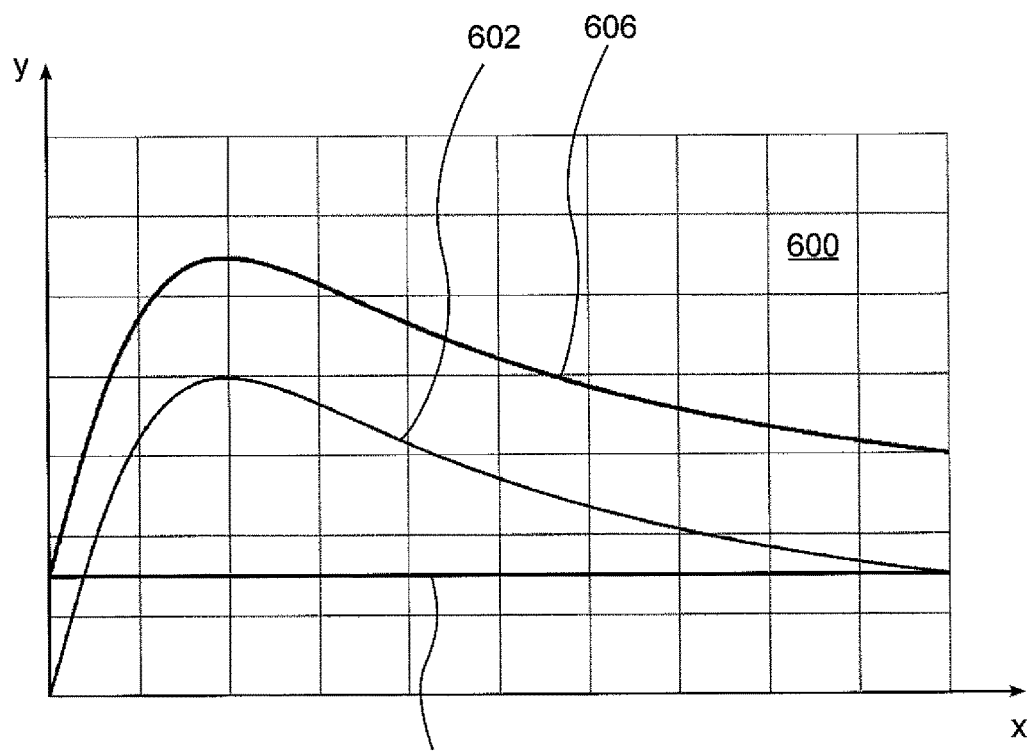

FIG. 8 shows a diagram 600 for brake moments of a magnetic field brake, such as the magnetic field brake 300 according to FIGS. 3-4 or the magnetic field brake 400 according to FIGS. 5-6, for an operation as an eddy-current brake and an operation as a hysteresis brake. In the diagram 600, on an x-axis, a speed is shown in rpm and on a y-axis a moment in Nm. The parameter 602 shows a moment progression during the operation as an eddy-current brake. The parameter 604 shows a moment progression during the operation as a hysteresis brake. The parameter 606 shows the sum of the parameters 602, 604. It is discernible that already at a speed of 0, here a brake momentum can be generated. During the operation of the magnetic field brake, here it can be switched respectively between the parameters 602, 604, 606, by way of an operation as an eddy-current brake, as a hysteresis brake, or a combination thereof. For the rest, additional reference is made particularly to FIGS. 3-7 and the corresponding description.

Figure 9:
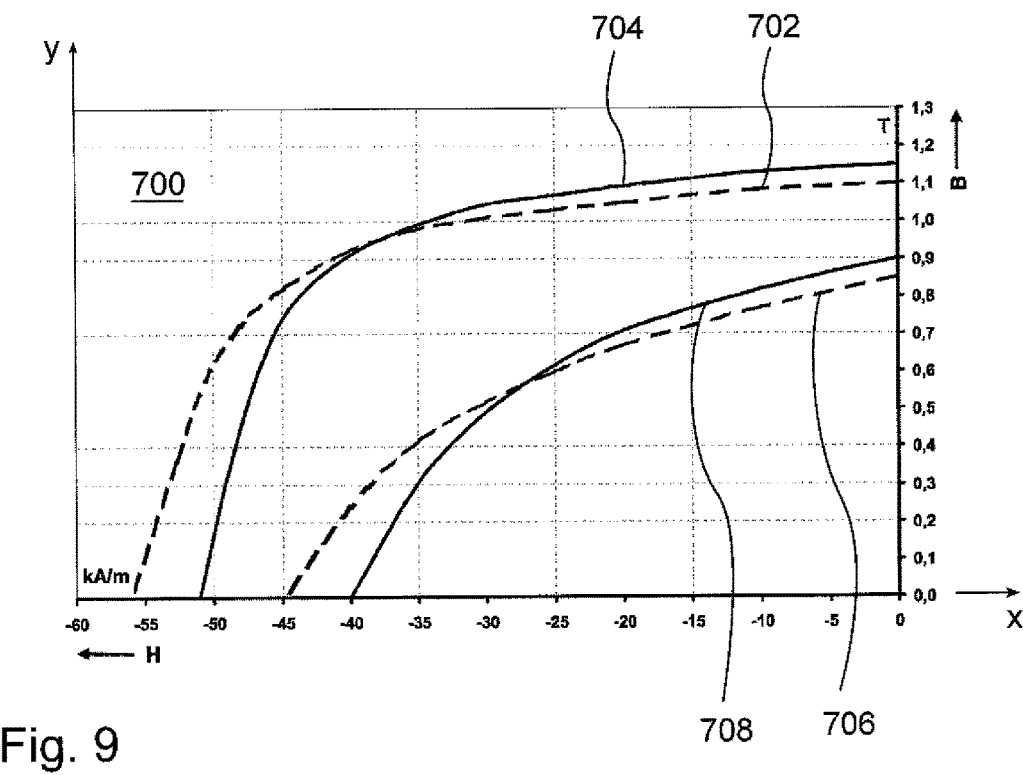

FIG. 9 shows a diagram 700 with parameters 702, 704, 706, 708 of magnetically semi-hard materials. In the diagram 700, on an x-axis, an induction B is shown and a field strength H on a y-axis. For the rest, additional reference is made particularly to FIG. 7 and the corresponding description.

LIST OF REFERENCE CHARACTERS 100 drive train
102 clutch device
104 internal combustion engine
106 two-weight flywheel
108 electric machine
110 transmission
112 wheel
114 input part
116 output part
118 stator
120 rotor
200 rotor
202 disk clutch
204 actuation device
206 axis of rotation
208 internal disk
210 external disk
212 pressure plate
214 compression plate
216 ramp ring
218 ball
220 freewheel device
222 internal ring
224 external ring
226 blocking body
228 freewheel cup
230 shaft
232 moment sensor
234 first sensor part
236 second sensor part
300 magnetic field brake
302 brake rotor
304 internal stator
306 external stator 308 first claw terminal
310 disk section
312 terminal claw
314 second claw terminal
316 disk section
318 terminal claw
320 central coil
322 floor section
324 wall section
326 carrier part
328 bearing
400 magnetic field brake
402 brake stator
404 brake rotor
406 carrier part
408 first claw terminal
410 second claw terminal
412 central coil
414 first disk section
416 external terminal claw
418 second disk section
420 internal terminal claw
422 floor section
424 wall section
426 bearing
428 external gears
500 brake rotor
502 first rotor section
504 second rotor section
506 floor section
508 wall section
510 opening
512 gears
514 eddy-current section
516 hysteresis section
600 diagram
602 parameter
604 parameter
606 parameter
700 diagram
702 parameter
704 parameter
706 parameter
708 parameter

The invention claimed is:

1. An actuation device for a clutch device, the actuation device comprising a magnetic field brake with a brake stator and a brake rotor, the magnetic field brake is operated as an eddy-current brake and as a hysteresis brake,
wherein the brake rotor comprises a first rotor section made from a first material and a second rotor section made from a second material,
the first material has a higher electric conductivity than the second material, the second material is a magnetically semi-hard material,
the first rotor section is a carrier for the second rotor section and the first rotor section has a cup-shaped profile including a radially inner hub defining a gear, and
the second rotor section is a flange extending cantilevered from a radially outer region of the first rotor section.

2. The actuation device according to claim 1, wherein the second rotor section has an annular form and is compressed with the first rotor section.

3. The actuation device according to claim 1, wherein the brake stator comprises an internal stator with a central coil and an external stator without a coil.

4. The actuation device according to claim 3, wherein the brake rotor has a cup-shaped form with a floor section and a wall section and the wall section is arranged between the internal stator and the external stator.

5. The actuation device according to claim 3, wherein the internal stator comprises a first claw terminal with first terminal claws and a second claw terminal with second terminal claws the central coil is encompassed by the first claw terminal with the first terminal claws and the second terminal claws with the second terminal claws and the external stator has a flat-annular form.

6. The actuation device according to claim 3, wherein the brake stator comprises a first claw terminal with a first terminal claw forming the external stator, and a second claw terminal with second terminal claws forming the internal stator, and the central coil is encompassed by the second claw terminal with the second terminal claws.

7. The actuation device according to claim 1, wherein the second material has a higher magnetic conductivity than the first material.

8. The actuation device according to claim 1, wherein the second material is a non-magnetized permanent magnetic material.

* * * * *